(12) United States Patent
Au et al.

(10) Patent No.: US 6,367,669 B1
(45) Date of Patent: Apr. 9, 2002

(54) FLUID DISPENSING APPARATUS

(75) Inventors: Yuk Cheung Au; Man Wai Chan, both of Kwai Chung (HK)

(73) Assignee: ASM Assembly Automation Ltd., Hong Kong (HK)

(*) Notice: Subject to any disclaimer, the term of this patent is extended or adjusted under 35 U.S.C. 154(b) by 0 days.

(21) Appl. No.: 09/735,637

(22) Filed: Dec. 14, 2000

(51) Int. Cl.$^7$ ................................................ B67D 3/00
(52) U.S. Cl. ...................................... 222/504; 222/426
(58) Field of Search ............................. 222/209, 334, 222/213, 214, 440, 447, 389, 63, 561, 258, 426, 504, 444

(56) References Cited

U.S. PATENT DOCUMENTS

| | | | |
|---|---|---|---|
| 3,632,022 A | * 1/1972 | Simmonds, Jr. | ............ 222/134 |
| 3,908,862 A | * 9/1975 | Chandra et al. | ............... 222/63 |
| 4,974,754 A | 12/1990 | Wirz | |
| 5,593,290 A | * 1/1997 | Greisch et al. | ............. 417/478 |
| 5,765,729 A | * 6/1998 | Miller et al. | ................. 222/380 |

* cited by examiner

*Primary Examiner*—Henry C. Yuen
*Assistant Examiner*—Melvin A. Cartagena
(74) *Attorney, Agent, or Firm*—Burns, Doane, Swecker & Mathis, L.L.P.

(57) ABSTRACT

Fluid dispensing apparatus for dispensing small precise metered quantities of fluid, for example in a semiconductor manufacturing process, comprises two metering chambers disposed in series. Each metering chamber has an associated piston rod and fluid is dispensed therefrom alternately. Twice the volume of fluid is displaced from the upstream metering chamber so that when it dispenses fluid at the same time it can refill the second downstream metering chamber.

13 Claims, 6 Drawing Sheets

FLUID DISPENSING APPARATUS

FIELD OF THE INVENTION

This invention relates to apparatus for dispensing fluids, and in particular to such apparatus for dispensing small precisely metered amounts of fluid. The invention is particularly useful for the supply of metered amounts of fluid such as silver epoxy in semi-conductor manufacturing processes, but is not limited thereto.

BACKGROUND OF THE INVENTION

In a number of manufacturing processes it is necessary to be able to dispense very small precisely metered amounts of sometimes relatively viscous fluid. One example of such a manufacturing process is in the semiconductor industry in which small precise amounts of silver epoxy must be dispensed onto a substrate prior to die attachment. The silver epoxy may be dispensed in the form of dots or continuous beads on the substrate, the precise amount and pattern varying depending on the size of the die and the product being formed.

PRIOR ART

A large variety of different types of dispensing apparatus have been proposed for dispensing small precisely metered amounts of fluid in industries such as the semiconductor manufacturing industry.

In a typical dispensing system, a time-pressure control unit is used to dispense fluid from a syringe. Fluid in the syringe is dispensed by compressed air that is controlled by the time-pressure unit. The syringe is mounted on a moving assembly and to dispense a dot or a continuous bead the assembly moves to the desired position horizontally and then down to the desired level. Pressure is applied to dispense the liquid epoxy.

Other types of dispensing apparatus may be termed positive displacement apparatus and may be termed diaphragm type and piston type.

An example of a known diaphragm type apparatus is described in detail in U.S. Pat. No. 4,974,754 (Wirz). This apparatus includes a metering chamber defined by a diaphragm that is operatively connected to an actuating device. An inlet opening and an outlet opening to the metering chamber are opened and closed by the diaphragm in response to movement of the actuating device. Such diaphragm devices have a number of disadvantages, however, including the fact that in the operating cycle time must be provided for refilling the metering chamber between dispensing operations, the fact that limited amounts of fluid can be dispensed per cycle, and the fact that worn parts need to be replaced in order to maintain dispensing accuracy.

Another known device may be considered to be an example of a piston type device. In this device two piston chambers are provided which define metering chambers for the fluid being dispensed. Fluid is dispensed from each of these piston chambers in turn with a valve that is moved between two positions so as to alternately connect the two piston chambers to an outlet. This valve is often a rotary or a sliding valve. This has an advantage over the diaphragm type device in that one piston is refilled while the other is being dispensed, but there is still an idle time while the valve is being moved between positions. Furthermore the valve can leak and bubbles may be created in the fluid when the valve is moved between piston chambers.

SUMMARY OF THE INVENTION

According to the present invention there is provided apparatus for dispensing metered amounts of a fluid, comprising: fluid supply means, an outlet and a fluid flow path between said supply and said outlet, wherein said fluid flow path comprises first and second metering chambers disposed in series and associated with first and second pistons for dispensing fluid from said chambers, wherein a first of said metering chambers disposed closest to said fluid supply means displaces a volume of fluid twice that of said second metering chamber disposed closest to said outlet.

In a preferred embodiment the metering chambers are generally tubular and are of an identical length, and wherein the fluid may be dispensed from the metering chambers by the movement of the associated piston rods therein, the piston rod associated with the first metering chamber having a diameter greater than the diameter of the piston rod associated with the second metering chamber by a factor of √2. The piston rods may have an identical length of travel between a home position and a limit position so that they may be operated by a single actuator.

Preferably the pistons move out of phase with each other into and out of said metering chambers such that fluid is dispensed from the two metering chambers alternately.

In a particularly preferred embodiment the fluid flow path comprises three switch valves operable to interrupt the fluid flow path, a first switch valve being provided between the fluid supply means and the first metering chamber, a second switch valve being disposed between the first and second metering chambers, and a third switch valve being disposed between the second metering chamber and the outlet.

In this arrangement, when the first and third switch valves are open and the second switch valve is closed, fluid is allowed to flow into the first metering chamber to fill the first metering chamber and at the same time fluid is dispensed from the second metering chamber to the outlet. When the first switch valve is closed and the second and third switch valves are open, half of the fluid in the first metering chamber is dispensed from the first metering chamber to the outlet and the other half of the fluid in the first metering chamber is used to fill the second metering chamber.

The apparatus may comprise a main body portion formed of two halves, with the fluid flow path being formed in one of the halves and the two halves being joined at an interface, and the three switch valves all being formed at the interface. A diaphragm may be located between the body portion halves, and means may be provided at the switch valves to urge the diaphragm into positions to open and close the fluid flow path.

According to another aspect of the present invention there is provided apparatus for dispensing metered amounts of a fluid, comprising: fluid supply means, an outlet and a fluid flow path between said supply and said outlet, wherein said fluid flow path comprises first and second metering chambers disposed in series and wherein fluid is alternately dispensed from said first and second metering chambers, and wherein when fluid is dispensed from the first metering chamber closest to said fluid supply means, a part of the fluid dispensed from the first metering chamber is used to fill the second metering chamber.

BRIEF DESCRIPTION OF THE DRAWINGS

An embodiment of the invention will now be described by way of example and with reference to the accompanying drawings, in which.

DETAILED DESCRIPTION OF PREFERRED EMBODIMENT

Figure 1:
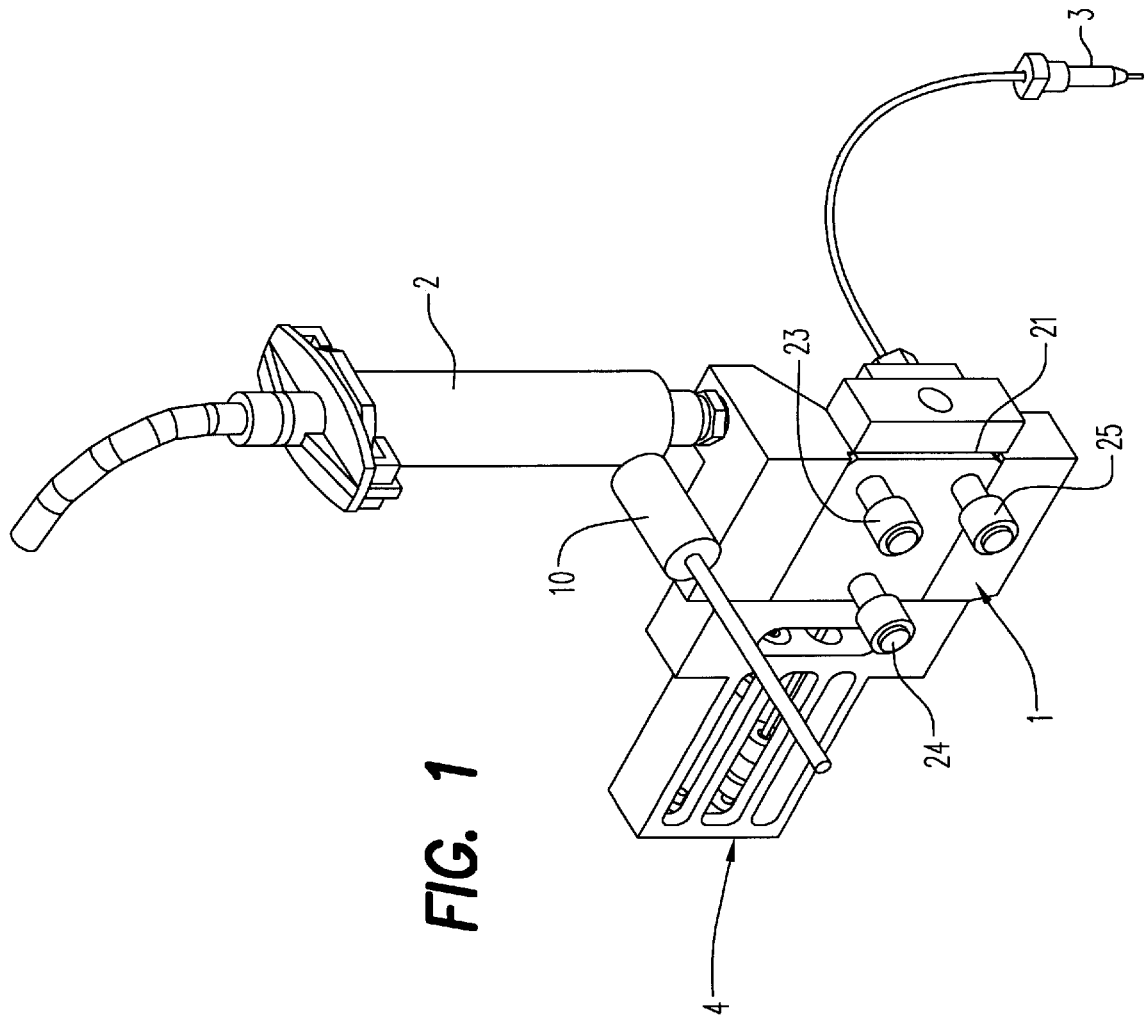
FIG. 1 is a perspective view of an embodiment of the present invention shown partly broken away.
Figure 2:
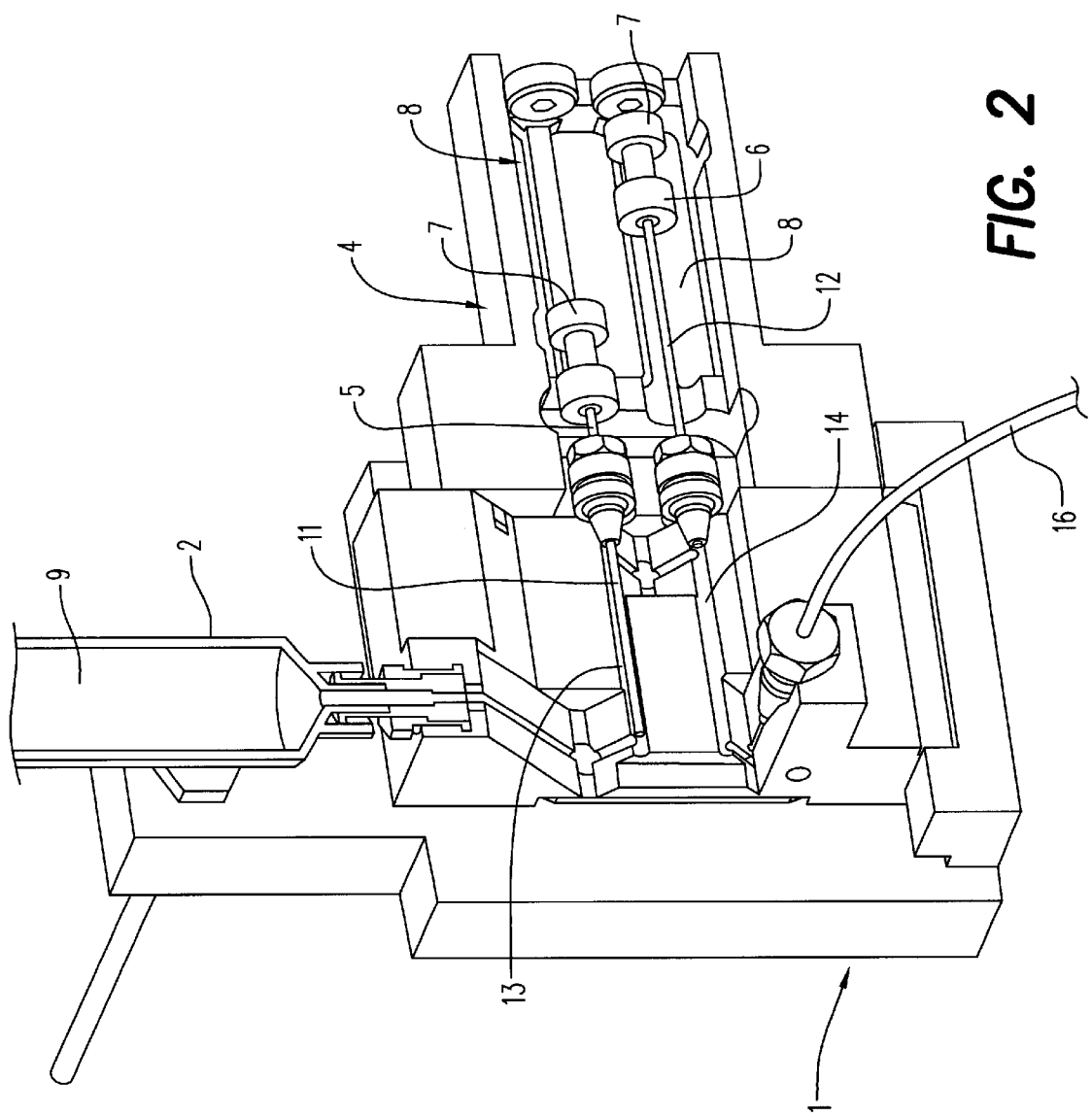
FIG. 2 is perspective view of the embodiment of FIG. 1 from the other side.

Referring firstly to FIGS. 1 and 2 there is shown therein a fluid dispensing apparatus in accordance with an embodiment of the present invention. The apparatus comprises a main body 1, a syringe 2 for holding a reservoir of fluid 9 (such as epoxy) and a dispensing nozzle 3 for fluid being dispensed. A low-level sensor 10 may be provided for determining when the level of liquid within the syringe has fallen below a certain level and requires replenishing. To the side of the main body 1 is formed a piston holding means 4 for holding and slidably supporting a pair of pistons 5 (upper), 6 (lower). Each piston 5,6 is formed with a slider 7 that engages in sliding rails 8 formed in the piston holding means 4. Each piston is formed with an elongate piston rod 11,12 that extends into parallel piston chambers 13,14 formed in the main body 1 as will be described in more detail below.

Each piston is adapted to reciprocate between a position in which the piston rod is at one extreme position in which the rod is not within the chamber (or at least not substantially within the chamber), and a limit position at which the piston rod is substantially within the chamber. It should be noted here that both pistons have the same length of travel, ie the distance between the home and limit positions, and can therefore be controlled by the same actuator. However, as will be explained below, it is necessary for the upper chamber to displace twice the volume of fluid compared to the lower chamber. Since the length of the two chambers must be the same for the pistons to have the same length of travel (which is preferable as will be explained below), this difference in volume of fluid displaced comes from a difference in the diameter of the piston rods associated with the two chambers and in particular the diameter of the piston rod associated with the upper chamber must be greater than the diameter of the piston rod associated with the lower chamber by a factor of √2.

Figure 3:
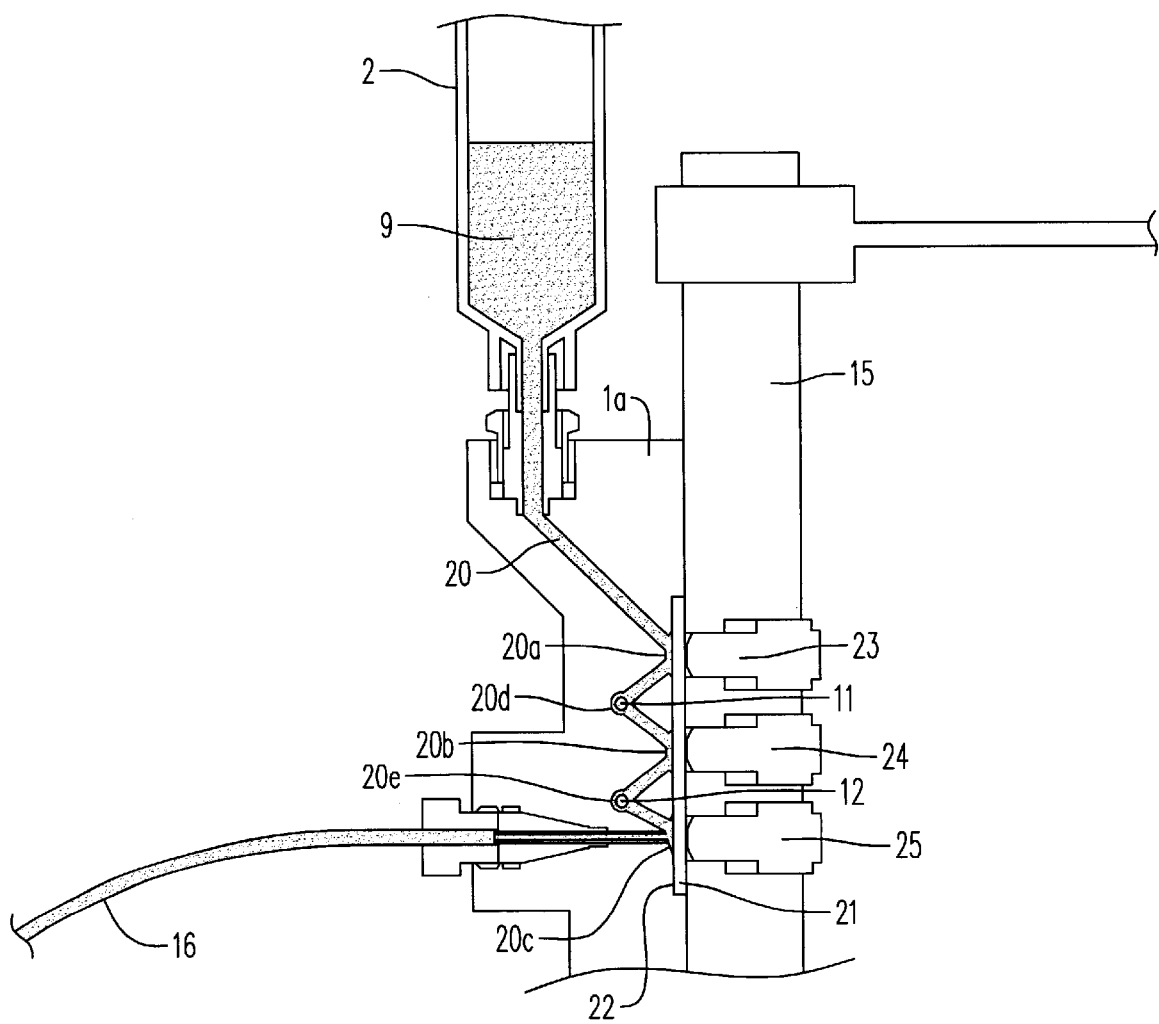
FIG. 3 is a sectional view from one end through the embodiment of FIGS. 1 and 2.

Referring now to FIG. 3, the main body 1 is formed of two halves 1a and 1b, and formed within a first half 1a of the main body 1 is a fluid dispensing path 20. Fluid dispensing path 20 includes the inlet from the fluid reservoir and the outlet to the dispensing nozzle 3. The dispensing nozzle 3 may in fact be some distance from the outlet and may be connected thereto by tubing 16. Between the fluid inlet and the fluid outlet, the dispensing path takes a zigzag pattern and reaches the interface between the two main body halves 1a, 1b at three locations 20a, 20b, and 20c. At two further locations, one 20d between locations 20a and 20b, the other 20e between locations 20b and 20c, the dispensing path intersects the distal ends of the two piston chambers 13,14. Location 20d is at the junction of the dispensing path and the distal end of upper piston chamber 13; location 20e is at the junction of the dispensing path and the distal end of lower piston chamber 14.

At the interface between main body parts 1a, 1b where the locations 20a–c are to be found is provided a diaphragm 21 that covers locations 20a–c. Diaphragm 21 may be located in a recessed area 22 of main body part 1a. Formed in main body part 1b at positions corresponding to locations 20a–c are three valves 23,24,25. Valve 23 is positioned at location 20a and is an inlet valve. Valve 24 is positioned at location 20b and is an intermediate valve, while valve 25 is an outlet valve and is positioned at location 20c. Each valve 23–25 is formed with a part spherical end surface 26 that corresponds to a part spherical surface formed in the dispensing path at locations 20a–c. It will be understood that the valves 23–25 may be operated to force the diaphragm 21 into the respective locations 20a–c to close off the dispensing path. Valves 23–25 are operated by pneumatic actuators not shown in the drawings.

Figure 4:
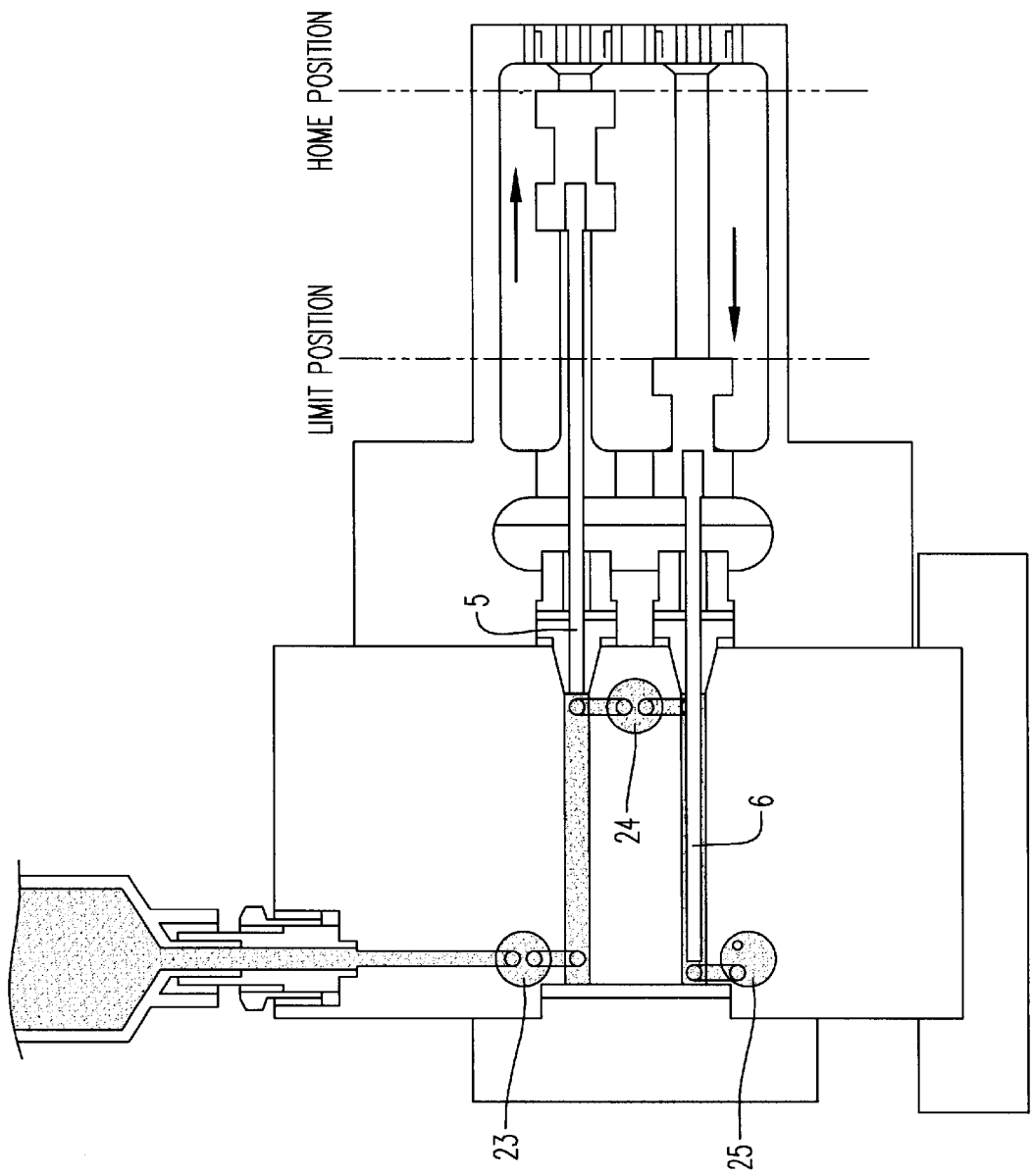
FIG. 4 is a sectional view from one side through the embodiment of FIGS. 1 and 2 in a first stage of the dispensing cycle.
Figure 5:
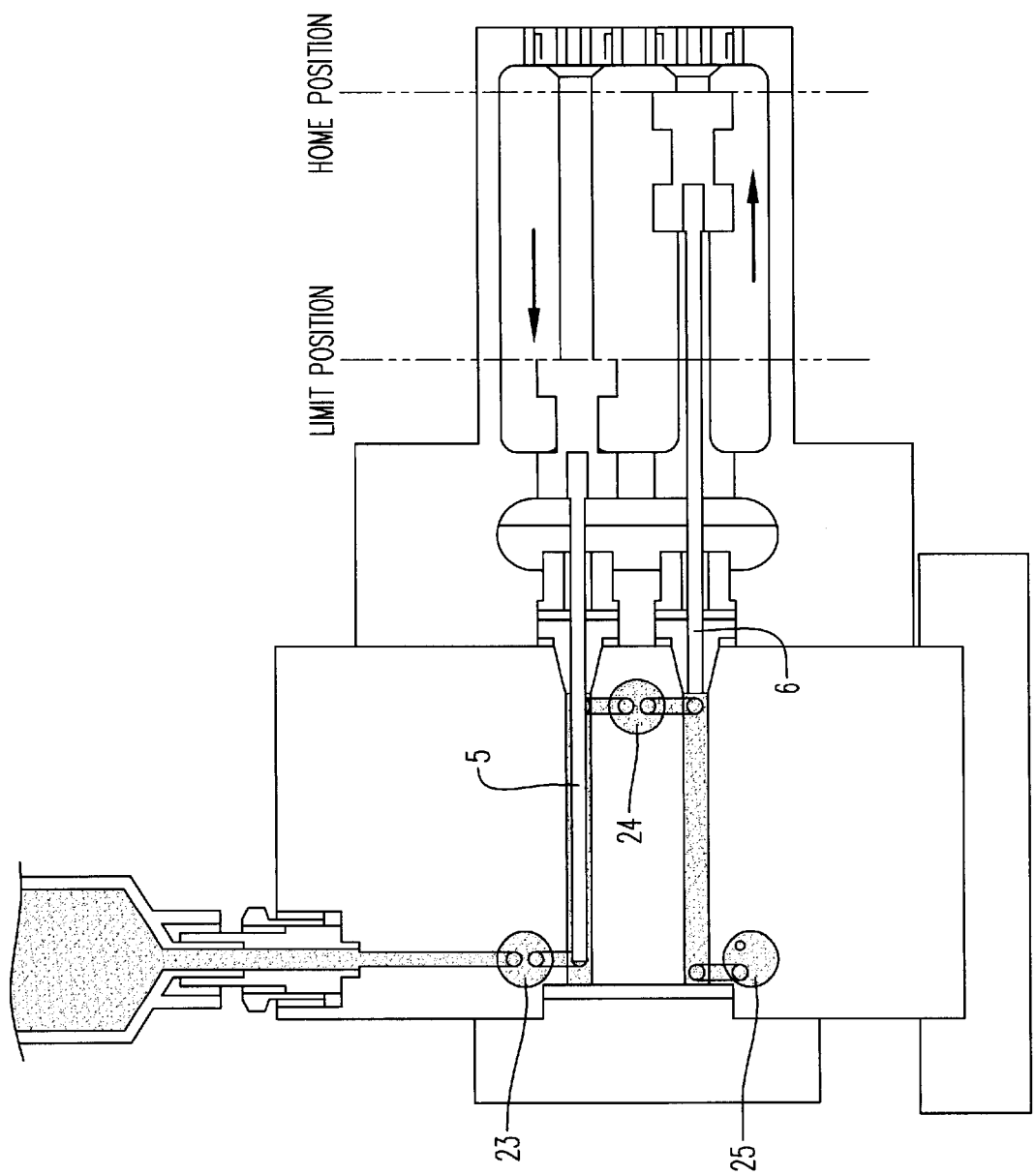
FIG. 5 is a view similar to FIG. 4 but in a second stage of the dispensing cycle.

The operation of the dispensing apparatus of this embodiment will now be described with particular reference to FIGS. 4 to 6. In the first stage shown in FIG. 4, the intermediate valve 24 is closed while inlet valve 23 and outlet valve 25 are open. In this condition the upper piston is returned toward its home position and fluid is drawn from the reservoir into the upper piston chamber. At the same time the lower piston is moved into the lower piston chamber toward its limit position and fluid is dispensed from the lower piston chamber through the outlet valve 25 towards the outlet. The second stage is shown in FIG. 5. In this stage, the inlet valve 23 is closed while the intermediate valve 24 and the outlet valve 25 are open. The upper piston moves from its home position into the upper piston chamber toward its limit position and fluid in the upper piston chamber is dispensed through the intermediate valve 24, lower piston chamber and outlet valve 25. At the same time, the lower piston is drawn back out of the lower piston chamber toward its home position so as to charge the lower piston chamber. In this second stage fluid is dispensed from the upper chamber through the lower chamber and serves at the same time to dispense the required amount of fluid through the outlet and fill the second chamber. If the amounts of liquid to be dispensed are to be identical from both the chambers, then it will be understood that the upper chamber must displace twice the volume of the lower chamber, since when the upper chamber is being dispensed it is simultaneously refilling the lower chamber and dispensing fluid to the outlet. Preferably the pistons should have the same length of travel so that a single actuator can béused to control movement of both the upper and lower pistons. This means that the difference in volume of the two chambers needs to be achieved by a difference in diameter of the two piston rods associated with the two metering chambers rather than a difference in length, and in particular the diameter of the upper piston rod should be larger than the diameter of the lower piston rod by a factor of √2 so that twice the volume of fluid is displaced from the upper chamber in comparison with the volume of fluid that is displaced from the lower chamber.

Figure 6:
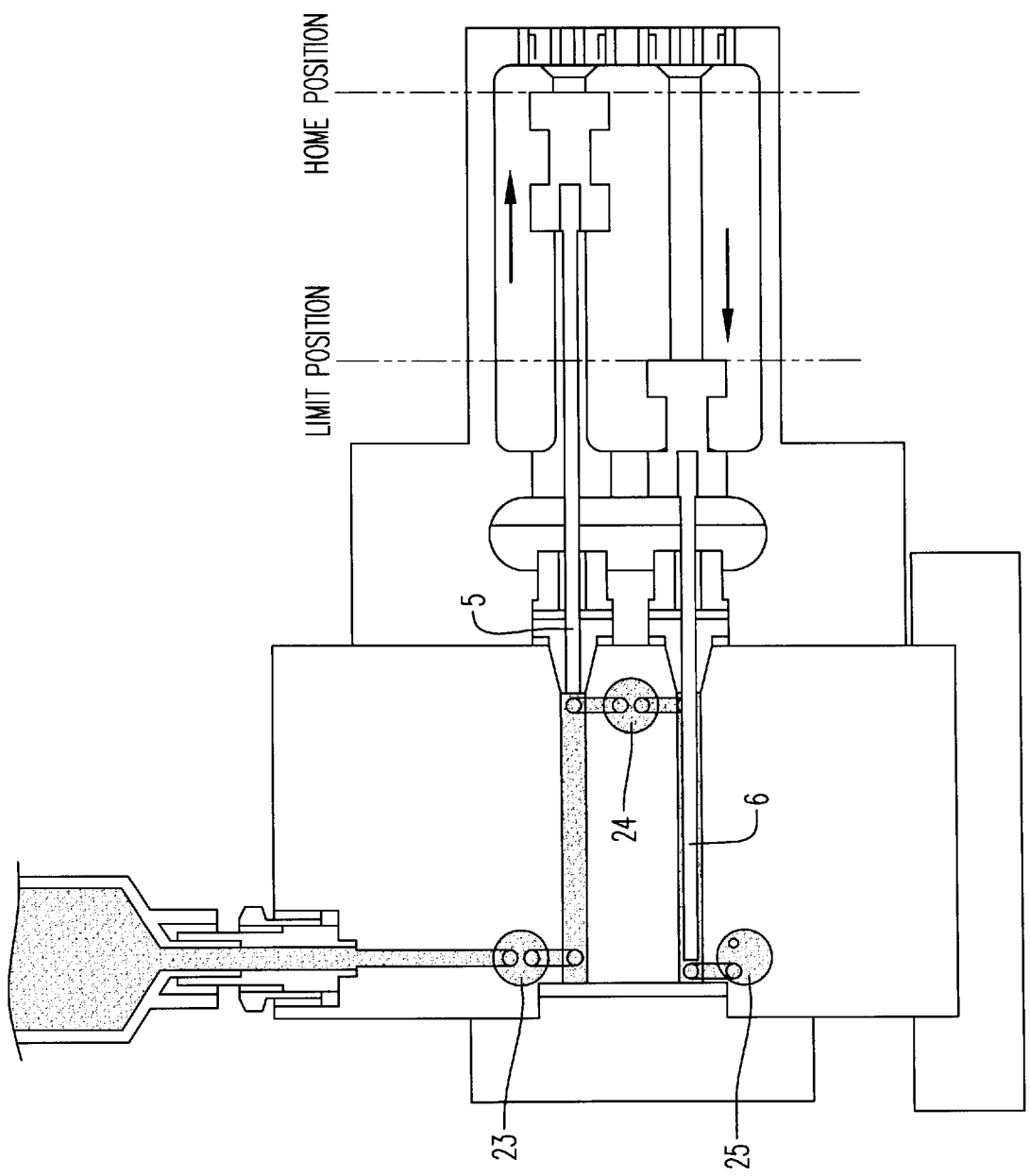
FIG. 6 is a view similar to FIGS. 4 and 5 but in a third stage in the dispensing cycle.

The third stage shown in FIG. 6 repeats the first and the cycle begins again. The intermediate valve 24 is closed and the inlet 23 and outlet 25 valves are open. The upper piston chamber is filled as the upper piston is drawn back toward its home position, while at the same time the lower piston moves into the lower piston chamber to force the fluid that was filled in that chamber in the previous stage to be dispensed through the outlet valve.

The skilled reader will appreciate that the present invention provides a number of advantages over the prior art. Firstly, idle time is minimized. Since one chamber is refilled while the other is used to dispense fluid, no time is wasted while waiting for a chamber to be filled. In contrast to prior piston designs, there is no sliding or rotary valve that needs to be physically moved to change between dispensing pistons and which causes delay in prior art piston type designs. Instead the valves 23–25 can be switched between open and closed conditions almost immediately. Indeed while described herein as valves since they function to control fluid flow, they may also be considered as switches that operate almost instantaneously. The absence of a sliding or rotary valve avoids the danger of bubbles being introduced into the fluid and avoids the danger of leakage at the valve. The possibility of leakage can further be limited if the piston rods are formed to slightly thinner than the diameter of the piston chambers so as not to slide against the walls of the piston chambers.

In contrast to the diaphragm design of Wirz, the metering chambers are defined by the piston chambers and are therefore of a reliable and repeatable size that will not change with wear.

A further important advantage of the present invention is that it comprises a continuous flow system with no dead volume. In the prior art designs dead volumes exist in which fluid may accumulate and potentially harden because there is no continuous flow of fluid. timing while shifting each value by an amount as much as one delay element is suiotably used. The delay means can output the tap coeffients by a simple construction using the delay elements.

The synthesizing means of the transversal filter is synthesizing means having multiplying circuits of the same number as that of sampling values and an adding circuit for adding outputs from the multiplying circuits. As a multiplying circuit, a multiplying circuit having impendances which are connected in parallel and to which the inputted sampling value is dividedly supplied, switches each of which is connected to each impendance in series and which opens or closes by a value of each bit constructing the inputted tap coefficient, an amplifier to which outputs from the switches are supplied, and a feedback impendance for feeding back an output of the amplifier is suitably used. The synthesizing means can weight the sampling value with the tap coefficient to synthesize them by a simple construction using the impendances, switches, and feedback amplifier.

According to the present invention, there is provided a receiver having an A/D converter for converting an output from the transversal filter to a digital signal and a program section for realizing functions fo the demodulating units. Since it can be applicable to a plurality of communication systems without having a band pass filter every communication systems, a circuit scale can be reduced.

What is claimed is:

1. Apparatus for dispensing metered amounts of a fluid, comprising: fluid supply means, an outlet and a fluid flow path between said supply and said outlet, wherein said fluid flow path comprises first and second metering ehambers disposed in series and associated with first and second pistons for dispensing fluid from said chambers, wherein a first of said metering chambers disposed closest to said fluid supply means displaces a volume of fluid twice that of said second metering chamber disposed closest to said outlet.

2. Apparatus as claimed in claim 1 wherein said metering chambers are generally tubular and are of an identical length and wherein fluid is displaced from said metering chambers by the movement of associated piston rods therein, the piston rod associated with the first metering chamber having a diameter greater than the diameter of the piston rod associated with the second metering chamber by a factor of $\sqrt{2}$.

3. Apparatus as claimed in claim 2 wherein said piston rods have an identical length of travel between a home position and a limit position and are operated by a single actuator.

4. Apparatus as claimed in claim 3 wherein said pistons move out of phase with each other into and out of said metering chambers.

5. Apparatus as claimed in claim 1 wherein said fluid flow path comprises three switch valves operable to interrupt said fluid flow path, a first switch valve being provided between a the fluid supply means and said first metering chamber, a second switch valve being disposed between said first and second metering chambers, and a third switch valve being disposed between said second metering chamber and said outlet.

6. Apparatus as claimed in claim 5 wherein when said first and third switch valves are open and said second switch valve is closed, fluid is allowed to flow into said first metering chamber to fill said first metering chamber and at the same time fluid is dispensed from said second metering chamber to the outlet.

7. Apparatus as claimed in claim 5 wherein when said first switch valve is closed and said second and third switch valves are open, half of the fluid in said first metering chamber is dispensed from said first metering chamber to said outlet and the other half of the fluid in said first metering chamber is used to fill said second metering chamber.

8. Apparatus as claimed in claim 5 wherein said apparatus comprises a main body portion formed of two halves, said fluid flow path being formed in one of said halves and said two halves being joined at an interface, and wherein said three switch valves are all formed at said interface.

9. Apparatus as claimed in claim 8 wherein a diaphragm is located between said body portion halves, and wherein means are provided at said switch valves to urge said diaphragm into positions to open and close said fluid flow path.

10. Apparatus as claimed in claim 1 wherein said piston rods have a diameter smaller than their respective metering chambers.

11. Apparatus as claimed in claim 1 wherein said fluid supply means comprises a syringe.

12. Apparatus as claimed in claim 11 wherein said syringe is provided with a low-level sensor for determining when the supply of fluid is low.

13. Apparatus for dispensing metered amounts of a fluid, comprising: fluid supply means, an outlet and a fluid flow path between said supply and said outlet, wherein said fluid flow path comprises first and second metering chambers disposed in series and wherein fluid is alternately dispensed from said first and second metering chambers, and wherein when fluid is dispensed from the first metering chamber closest to said fluid supply means, a part of the fluid dispensed from the first metering chamber is used to fill the second metering chamber.

* * * * *